(12) United States Patent
Karakawa

(10) Patent No.: US 6,774,881 B2
(45) Date of Patent: *Aug. 10, 2004

(54) MONOCHROMATIC R,G,B LASER DISPLAY SYSTEM AND METHOD

(75) Inventor: Masayuki Karakawa, Marlborough, MA (US)

(73) Assignee: Corporation For Laser Optics Research, Portsmouth, NH (US)

(*) Notice: Subject to any disclaimer, the term of this patent is extended or adjusted under 35 U.S.C. 154(b) by 365 days.

This patent is subject to a terminal disclaimer.

(21) Appl. No.: 09/977,835

(22) Filed: Oct. 15, 2001

(65) Prior Publication Data

US 2002/0018036 A1 Feb. 14, 2002

Related U.S. Application Data

(63) Continuation of application No. 09/319,058, filed as application No. PCT/US97/22066 on Nov. 28, 1997, now Pat. No. 6,304,237.
(60) Provisional application No. 60/032,269, filed on Nov. 29, 1996.

(51) Int. Cl.[7] .................................................. G09G 3/34
(52) U.S. Cl. .......................................... 345/84; 372/22
(58) Field of Search ........................... 345/84, 85, 32, 345/102, 88, 44, 46, 39, 82, 83; 359/619, 629; 372/23, 22, 26, 31; 353/31; 348/661, 760

(56) References Cited

U.S. PATENT DOCUMENTS

| | | |
|---|---|---|
| 3,514,534 A | 5/1970 | Korpel |
| 4,611,245 A | 9/1986 | Trias |
| 4,653,056 A | 3/1987 | Baer |
| 4,656,635 A | 4/1987 | Baer |
| 4,701,929 A | 10/1987 | Baer |
| 4,833,528 A | 5/1989 | Kobayashi |
| 4,978,202 A | 12/1990 | Yang |
| 5,029,975 A | 7/1991 | Pease |
| 5,136,599 A | 8/1992 | Wilcox |
| 5,170,156 A | 12/1992 | DeMond et al. |
| 5,307,088 A | 4/1994 | Inuzuka et al. |
| 5,307,359 A | 4/1994 | Sarraf |
| 5,317,348 A | 5/1994 | Knize |
| 5,388,114 A | 2/1995 | Zarrabi et al. |
| 5,434,875 A | 7/1995 | Rieger et al. |
| 5,440,352 A | 8/1995 | Deter et al. |
| 5,485,225 A | 1/1996 | Deter et al. |
| 5,504,602 A | 4/1996 | Farmer |
| 5,802,086 A | 9/1998 | Hargis et al. |
| 5,828,424 A | 10/1998 | Wallenstein |
| 6,025,885 A | 2/2000 | Deter |
| 6,304,237 B1 * | 10/2001 | Karakawa ................. 345/84 |

FOREIGN PATENT DOCUMENTS

WO   PCT/US95/00581   8/1995

* cited by examiner

Primary Examiner—Chanh Nguyen
(74) Attorney, Agent, or Firm—Ropes & Gray LLP

(57) ABSTRACT

A monochromatic red (R), green (G), blue (B) pulsed laser source with reduced speckle noise is disclosed. The R, G, B laser source can be used in a full color video/image display system, particularly an LCD display system.

15 Claims, 3 Drawing Sheets

MONOCHROMATIC R,G,B LASER DISPLAY SYSTEM AND METHOD

REFERENCE TO RELATED APPLICATIONS

This application is a continuation of U.S. patent application Ser. No. 09/319,058, filed May 27, 1999, now U.S. Pat. No. 6,304,237, which is a US National Phase application of PCT/US97/22066, filed Nov. 28, 1997, which claims the benefit of U.S. provisional application Ser. No. 60/032,269, filed Nov. 29, 1996, all of which are hereby incorporated by reference.

BACKGROUND OF THE INVENTION

A monochromatic red (R), green (G), and blue (B) light source having well color-balanced white light output is a very desirable light source for many display applications, because it is known to be more efficient compared to other conventional incoherent "white light" light sources with red, green and blue filters. For example, used in conjunction with 3 channel, transmissive Liquid Crystal Display (LCD) panel modulator based projection display systems, the monochromatic R,G,B light source producing well color-balanced white light can achieve a significantly higher optical efficiency than conventional high-intensity incoherent light sources, such as Xenon lamps or Metal Halide lamps with red, green and blue filters.

Monochromatic R,G,B light can originate from lasers producing a visible output at red, green and blue wavelengths. However, previous attempts to develop such lasers had the following shortcomings:

Gas lasers have an unacceptably low wall plug efficiency and require frequent maintenance.

Some of the 3 primary wavelengths generated by the R,G,B lasers may not be suited for display use.

Some spatial light modulators used in display applications work well with continuous wave (cw) R,G,B lasers. The others need pulsed R,G,B lasers. It has been known to be very difficult to generate suitable R,G,B colors efficiently from cw laser designs, and coupling of spatial light modulators, which require cw light sources, with pulsed lasers has in the past proven to be difficult due to an unacceptably long pulse duration.

Another serious problem associated with past R,G,B lasers is laser speckle, which can be caused by a random interference pattern resulting from the reflection or transmission of highly coherent light from (or through) an optically rough surface (one whose local irregularities in depth are greater than one quarter of a wavelength from a laser). The speckle is very annoying to look at, and past attempts employed to minimize the speckle have been to disturb the phase coherency associated with each wave front, for example, by vibrating the projection screens.

SUMMARY OF THE INVENTION

The invention relates to a monochromatic laser system; display systems employing the light source; and the method of providing the light source and displays. The invention is directed to a monochromatic R,G,B laser adapted for display applications, and particularly, LCD display systems. The light source includes a single or multiple laser master oscillator with a laser medium, for example, a neodymium (Nd)-containing laser medium, particularly, Nd:YVO$_4$, neodymium yttrium vanadate, to provide a signal wave laser radiation, e.g., of about 1342 nm, 1047 nm and 1064 nm of a selected pulse width and pulse rate, and single or multiple laser power amplifier to amplify the power of the laser radiation. The light source includes single or multiple, preferably all solid state, non-linear frequency converters to receive and convert the amplified signal wave laser radiation to produce a green wavelength, e.g., about 532 nm or 523.5 nm; with slight spatial incoherency to reduce speckle; red wave length, e.g., about 626 nm to 629 nm with narrow spectrum incoherency to reduce speckle; and blue wave length, e.g., about 447 nm to 452 nm, which R,G,B wavelengths are particularly useful for color display purposes, such as when the light source is coupled with, and used in a three LCD display system, as hereinafter described.

The invention is also directed to a method by which speckle noise resulting from laser sources may be reduced. Laser light produces a speckle noise, since it has a long coherent length. Speckle noise of lasers can be reduced by introducing spatial incoherency in the green spectral range, which is most visible to the human eye, and by multimode operation and producing spectrum incoherency in the red spectral range. Speckle noise in the blue portion of the spectrum is typically not a significant issue due to the reduced sensitivity of the eye.

Pulsed operation of the R,G,B laser is advantageous, since pulsed operation permits the use of various non-linear frequency conversion processes, such as Optical Parametric Oscillation (OPO) and Sum Frequency Mixing (SFM) to produce visible wavelengths from the fundamental laser radiation.

The invention is also directed to display systems employing the monochromatic R,G,B laser, particularly for LCD display systems, since LCD panel (one of spatial light modulators) does not require pulse width modulation, the R,G,B laser light source may be coupled to three LCD panels (one panel for each primary color) to create a display system.

The invention presents a monochromatic R,G,B light source which incorporates:

a solid state laser design which produces very high electrical to optical efficiency;

a laser cavity design that operates at high pulse repetition rate (40–80 kHz range) and produces very short pulse (FWHM ~7 ns range), or another design that operates at very high pulse repetition rate (>>1 MHz range) and produces ultra short pulse width (FWHM ~100 ps range) with active modelock mechanism, which allows this monochromatic R,G,B light source to be coupled with many different spatial light modulators, which requires R,G,B light source that operates in cw or quasi-cw mode; and a green and red laser design which produces multi-mode laser radiation (for green, $M^2$~10). The multi-mode operation of the laser helps increase the spatial incoherency, thus, reducing the speckle effect.

The invention will be described for the purposes of illustration only in connection with certain illustrated embodiments; however, it is recognized that those persons skilled in the art may make various additions, improvements, modifications and changes to the illustrated embodiments, without departing from the spirit and scope thereof.

DESCRIPTION OF THE CERTAIN ILLUSTRATED EMBODIMENTS

The performance goals of the monochromatic R,G,B laser are usually defined by the requirement for pulse repetition rate and FWHM (full-width half-max) pulse width, as well as producing high luminosity, well color-balanced white light when R,G,B laser light are mixed together. The monochromatic R,G,B laser incorporates a diode-pumped solid state laser made of, for example, Nd:YVO$_4$ emitting at 1064 nm and/or 1342 nm. A multi-stage Master oscillator/Power Amplifier (MOPA) configuration can be used to achieve both very short pulse width and high average power at high pulse repetition rate.

Figure 1:
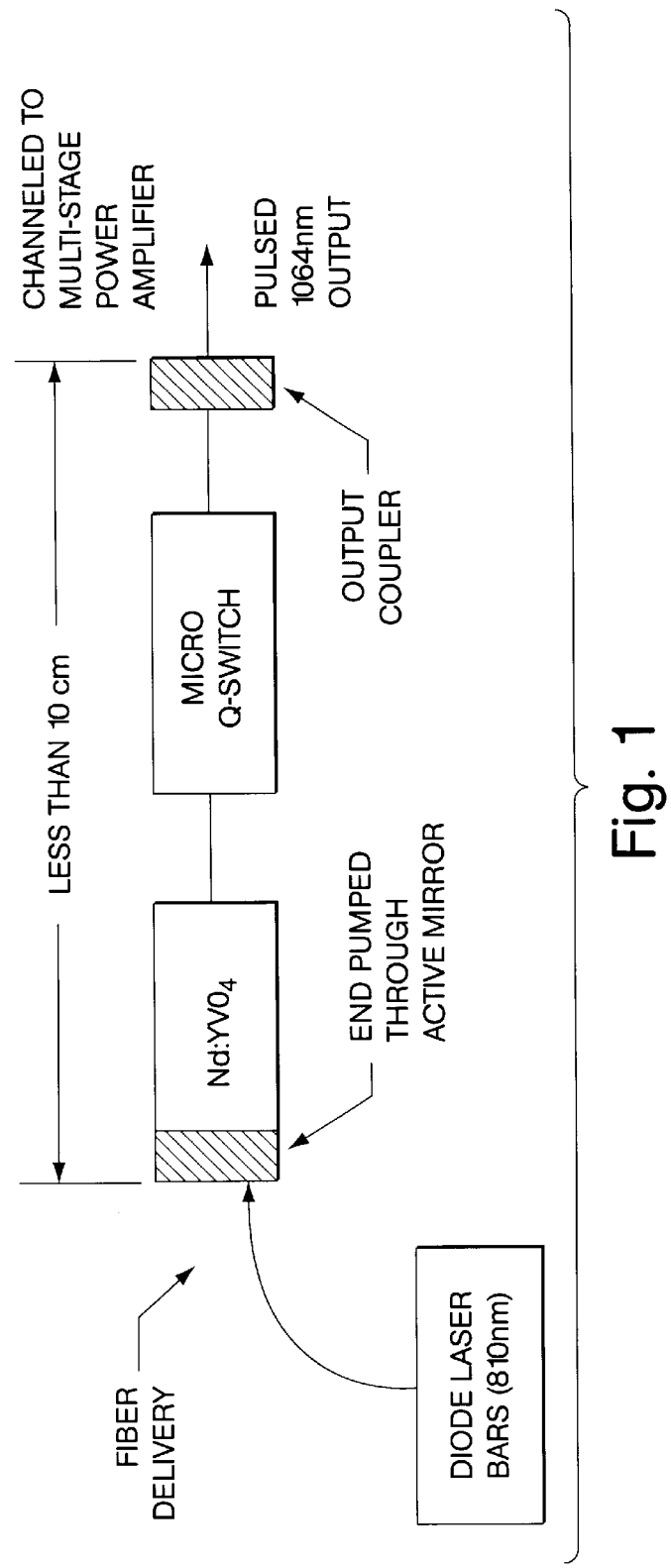
FIG. 1 is a schematic block diagram of a master oscillator used in the light source.

The schematic diagram of the master oscillator is shown in FIG. 1. The primary requirement of the master oscillator is to produce 1064 nm pulsed laser radiation output, which has the pre-determined combination of pulse width (<7 ns) and pulse repetition rate (>40 kHz). The Nd:YVO$_4$ crystal (typical size: 4 mm×4 mm×5 mm) with active mirror will be optically pumped by a cw, fiber-coupled, diode laser bar (average output power ~20 W with peak wavelength ~807 nm) having one end of 500 $\mu$m diameter fiber fixed within 100 $\mu$m of the Nd:YVO$_4$ crystal. The pump end of the crystal is polished to function as an active end mirror, or a separate pump mirror may be used to focus the pump beam from the cw, fiber-coupled, diode laser bar. The pulsing of the laser is achieved by an acousto-optic or electro-optic Q switch placed in the master oscillator resonator cavity.

The primary requirement of the power amplifier is to gradually amplify the signal produced by the master oscillator and increase the average power of the 1064 nm laser radiation. The master oscillator is coupled through output coupler to multiple Nd:YVO$_4$ based gain modules (e.g., power amplifiers), and the average output power increases as more gain modules are added to the master oscillator. Each gain module is constructed from Nd:YVO$_4$ crystal slab transversely pumped by one or two cw diode laser bars (output power 20 W; peak wavelength 807 nm). One side of the Nd:YVO$_4$ crystal slab is slightly roughened to suppress parasitic modes within the Nd:YVO$_4$ crystal. In general, the Nd:YVO$_4$ crystal has extremely high gain, thus, approximately 50% of optical pumping power from cw diode laser bar can be converted to 1064 nm laser radiation in both master oscillator and power amplifier configurations. The beam divergence of this fundamental laser radiation (1064 nm) is near diffraction-limited; therefore, the beam quality is very well suited for non-linear wavelength conversion means and methods to produce the desired R,G,B colors, which are explained in detail below. It will be understood that the MOPA can also be used at other emission wavelengths of the crystal, such as 1342 nm.

Depending upon a set of requirements imposed by the spatial light modulator used for imaging/display application, high pulse repetition rate and/or very short pulse width may not be needed—For these applications Nd:YAG (Neodymium: Yttrium Aluminum Garnet) and/or Nd:YLF (Neodymium: Yttrium Lithium Fluoride) (laser radiation: 1047 nm) crystals may be used as alternative laser mediums to Nd:YVO$_4$, for the construction of multi-stage MOPA described above. KTA, KTP, LBO, and BBO are crystals which produce various non-linear frequency conversion to produce desirable red, green and blue wavelengths from 1064 nm or 1047 nm laser radiation. SHG (Second Harmonic Generation), THG (Third Harmonic Generation) and OPO (Optical Parametric Oscillation) are non-linear frequency conversion processes accomplished by these crystals.

Figure 2:
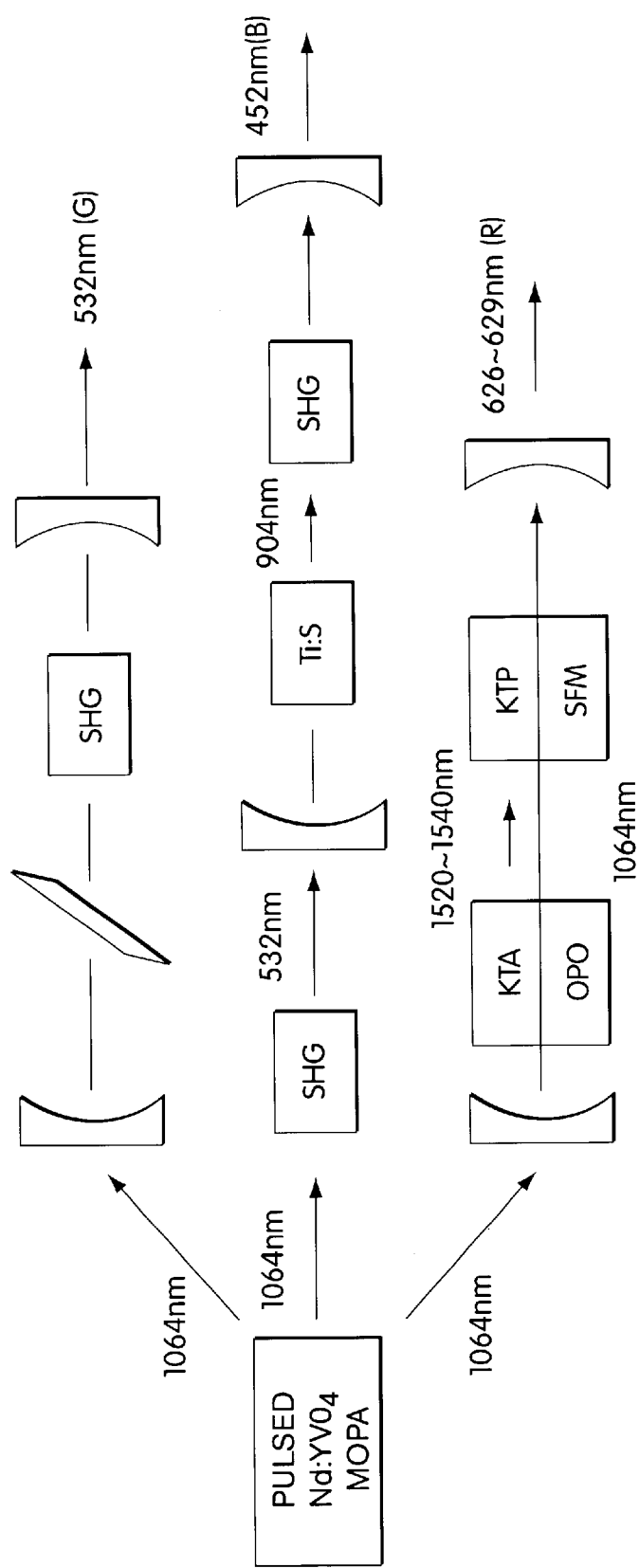
FIG. 2 is a schematic block diagram of the R,G,B laser with the master oscillator of FIG. 1.

The schematic block diagram of the monochromatic R,G,B laser described is shown in FIG. 2. Approximately 14% of 1064 nm laser radiation from Nd:YVO$_4$ based MOPA is separated from the rest by a beam splitter and frequency doubled to produce green light at 532 nm, which will be used for green (G) light source for the display. 60% Second Harmonic Generation (SHG) efficiency with Type I LBO (Lithium Triborate) or Type II KTP (Potassium Titanyl Phosphate) from the fundamental to the green is an achievable goal, and the SHG cavity is constructed to include an etalon plate to produce etalon induced longitudinal modes, as well as the main TEM00 mode. The small amount of this etalon induced longitudinal modes helps increase the spatial incoherency, thus reducing speckle, and yet maintain near-diffraction limited green beam in transverse direction, which is important to produce bright and crisp images for display applications. Alternatively, the unstable resonator configuration is adopted for the SHG cavity design to generate green (532 nm) from 1064 nm. The unstable resonator configuration generates the multi-mode laser operation in tranverse direction, therefore, the green (532 nm) output produces small amounts of spatial incoherency ($M^2$~10), which also helps reduce speckle.

Approximately half of the remaining 1064 nm laser radiation from Nd:YVO$_4$ based MOPA is frequency-doubled by Type I LBO or Type II KTP to produce green (532 nm) light. This green laser light is used to longitudinally pump a Ti:S (Titanium: Sapphire) rod, and infrared emission from Ti:S is tuned to 904 nm by multi-birefringent plate (thickness 1 T), then intracavity frequency doubled with Type I BBO (Beta-Barium Borate) or LBO (Lithium Triborate) to produce blue light at 452 nm. A conversion efficiency of 15–20% from green pump power to blue can be expected. The spatial mode of this blue laser is near-diffraction limited. Since the Ti:S laser has very broad emission bandwidth in near infrared region (~700–1,000 nm), the blue wavelength can be tuned between 430 nm and 460 nm by selecting different optical coatings and birefringent plate sets. This wavelength tuning capability helps create different R,G,B color spaces for various display needs. As mentioned above, Nd:YVO$_4$ has several transition lines, the primary one is 1064 nm and another is 1342 nm. Although the second transition line at 1342 nm is approximately 3 times weaker than the primary one (1064 nm), it can still lase with proper coating modifications.

Alternate blue laser design uses Nd:YVO$_4$ based MOPA with laser medium and optics coated for 1342 nm emission. Using Type I LBO crystal to generate 671 nm (SHG of 1342 nm) and additional Type I LBO or Type II KTP to achieve Sum Frequency Mixing (SFM) between 1342 nm and 671 nm results in generation of 447 nm. This process is known as Third Harmonic Generation (THG). Therefore, THG of 1342 nm emission from Nd:YVO$_4$ produces blue emission at 447 nm, and this blue laser design can be used as an alternate monochromatic light source design for the blue wavelength.

Finally, the remaining half of 1064 nm radiation can be used to pump a potassium titanyl arsenate (KTA) based intracavity optical Parametric oscillation (OPO) and to produce red at wavelengths between 626 nm and 629 nm by Sum Frequency Mixing (SFM). KTA pumped at 1064 nm has been demonstrated to produce a signal wavelength at 1520 nm 1540 nm and an idler wavelength (~3540 nm). Unlike potassium titanyl phosphate (KTP), KTA does not exhibit reabsorption of the idler wavelength (~3540 nm), so that a relatively high conversion efficiency (~60%) can be expected from a KTA-based OPO.

A separate Type III KTP is used for Sum Frequency Mixing, and it has a phase match angle of 77° for SFM process between the wavelength of 1520 nm-1540 nm and 1064 nm, producing the resulting red wavelength of between 626 nm and 629 nm with an expected SFM conversion efficiency of approximately 30%. This red laser produces near-diffraction limited mode, just as the previously discussed blue laser; however, its laser radiation consists of red wavelengths extending over a range between 626 nm and 629 nm. This slight spectrum incoherency helps reduce the speckle effect. Likewise, Type II KTA or Type I LBO can be used instead of Type III KTP to achieve Sum Frequency Mixing (SFM) between 1520–1540 nm and 1064 nm for producing the desired red wavelength of 626–629 nm.

The majority of luminance contribution (>90%) in white light comes from green and red light portions of the monochromatic R,G,B laser. As described above, the monochromatic R,G,B laser design with reduced speckle noise is based on a green laser output with spatial incoherency (i.e., multi-mode structure), and a red laser output with spectral incoherency (i.e., spectral broadening).

Figure 3:
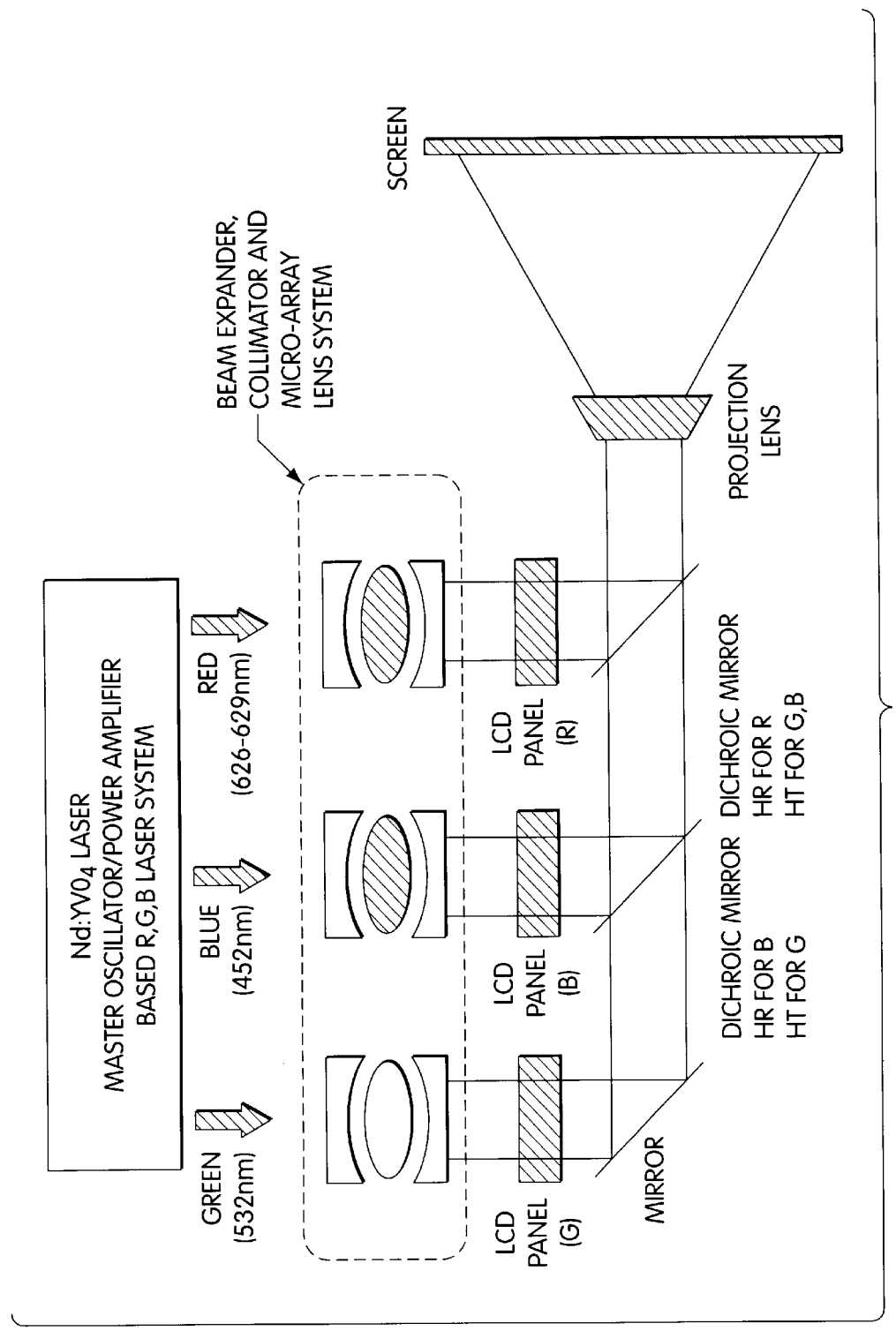
FIG. 3 is a schematic LCD laser display system with three transmissive LCD panels.

The schematic diagram of the monochromatic R,G,B laser coupled with three transmissive LCD panels as the spatial light modulators is shown in FIG. 3. Since LCD panels are insensitive to pulse width modulation, the aforedescribed R,G,B laser with reduced speckle can be coupled to both transmissive and reflective LCD light-modulating panels. Especially when the monochromatic R,G,B light source is coupled with the transmissive LCD panel, an exactly same size panel of n×m micro-lens array (n: # of rows of the transmissive LCD panel; m: # of columns of the transmissive LCD panel), and other optics should be added between the monochromatic R,G,B laser and the transmissive LCD panel to ensure the highest transmission efficiency of light through the LCD panel, and minimize the effect of diffraction of light caused by the grid structures within the LCD panel. An additional panel of n×m micro-lens array may be used on the opposite side of the LCD panel to re-collimate the transmitted light.

When the choice of spatial light modulator used for imaging or display applications requires cw or quasi-cw light source, this monochromatic R,G,B laser can adopt active mode-locking mechanism to produce ultra fast pulse. Active mode-locking by loss modulation is commonly used to generate pulses from lasers with rather limited gain bandwidth such as Nd:YAG lasers. The loss modulation is implemented by using acousto-optic modulator driven by an ultra stable RF signal generator. Pulse duration (FWHM) in the range of 80–100 ps are typically achieved. Therefore, constructing the master oscillator from a Nd:YAG crystal with active mode-locking mechanism, and constructing the power amplifier from a Nd:YAG based laser gain modules will allow the monochromatic R,G,B laser to produce ultra fast pulse, thus, operate in quasi-cw mode. This will be very useful as a light source for certain types of spatial light modulators that require the pulse width modulation less than 1 ns.

The monochromatic R,G,B laser described above can be used as a light source for many different imaging applications, including display applications. Although the specific example of three transmissive LCD panels with the monochromatic R,G,B laser has been discussed in detail, the invention can be coupled with other different types of spatial light modulators; such as, but not limited to reflective LCD panels; spatial light modulators; acousto-optic spatial light modulators, as detailed in U.S. Pat. Nos. 4,720,747 and 4,851,918; Deformable Mirror Devices (DMD), manufactured, for example, by Texas Instruments; and electromechanical, high speed, optical beam deflectors, such as piezoelectric devices to deflect and position R,G,B optical beams onto a projection screen surface.

I claim:

1. An R,G,B laser light source with reduced speckle noise adapted for use with a display system, which light source generates R, G and B beams and comprises:

a laser with a laser medium producing a laser output beam with a plurality of output beam wavelengths;

an R-channel receiving a first portion of the output beam at a first output beam wavelength and generating the R beam, with the R-channel including a resonant cavity with a first nonlinear crystal producing optical radiation having a first wavelength that is greater than the first output beam wavelength and a spectral width that is greater than a spectral width of the first output beam wavelength, and a second nonlinear crystal that combines the radiation of the first wavelength with the first portion of the output beam to generate the R beam by sum frequency mixing, said R-beam having a spectral width determined by the spectral width of the optical radiation of the first wavelength;

a G-channel receiving a second portion of the output beam at the first output beam wavelength and generating the G beam, with the G-channel including a resonant cavity with a third nonlinear crystal producing second harmonic optical radiation of the first output beam wavelength, with the cavity of the G-channel further including an etalon that produces a plurality of longitudinal G-channel resonant cavity modes which define a spectral width of the G-channel; and a B-channel receiving a portion of the output beam at a second output beam wavelength;

a first harmonic crystal producing a frequency-doubled wavelength of the second output beam wavelength; and a fourth nonlinear crystal that combines the laser output beam at the second output beam wavelength with the frequency-doubled wavelength of the second output beam wavelength to produce the B beam;

with the spectral width of the R-channel and the G-channel reducing the speckle noise of the R,G,B laser light source.

2. The laser light source of claim 1, wherein the first output beam wavelength is one of 1047 nm and 1064 nm, and the second output beam wavelength is 1342 nm.

3. The laser light source of claim 1, wherein the laser medium is neodymium-yttrium-vanadate (Nd:YVO$_4$).

4. The laser light source of claim 1, wherein the laser output beam that includes the plurality of output beam wavelengths is a substantially single beam.

5. The laser light source of claim 1, wherein the laser output beam that includes the plurality of output beam wavelengths comprises a first output beam at the first output beam wavelength and a second output beam, which is different from the first output beam, at the second output beam wavelength.

6. A color image video display system comprising:

an R,G,B laser light source with reduced speckle noise, which light source generates R, G and B beams and includes a laser with a laser medium producing a laser output beam of selected pulse width and a plurality of output beam wavelengths;

an R-channel receiving a first portion of the output beam at a first output beam wavelength and generating the R beam, with the R-channel including a resonant cavity with a first nonlinear crystal producing optical radiation having a first wavelength that is greater than the first output beam wavelength and a spectral width that is greater than a spectral width of the first output beam wavelength, and a second nonlinear crystal that combines the radiation of the first wavelength with the first portion of the output beam to generate the R beam by sum frequency mixing, said R-beam having a spectral width determined by the spectral width of the optical radiation of the first wavelength;

a G-channel receiving a second portion of the output beam at the first output beam wavelength and generating the G beam, with the G-channel including a resonant cavity with a third nonlinear crystal producing second harmonic optical radiation of the first output beam wavelength, with the cavity of the G-channel further including an etalon that produces a plurality of longitudinal G-channel resonant cavity modes which define a spectral width of the G-channel; and a B-channel receiving a portion of the output beam at a second output beam wavelength;

a first harmonic crystal producing a frequency-doubled wavelength of the second output beam wavelength; and a fourth nonlinear crystal that combines the laser output beam at the second output beam wavelength with the frequency-doubled wavelength of the second output beam wavelength to produce the B beam.

7. The system of claim 6, wherein the first output beam wavelength is one of 1047 nm and 1064 nm, and the second output beam wavelength is 1342 nm.

8. The system of claim 6, wherein the laser medium is neodymium-yttrium-vanadate.

9. The system of claim 6, further comprising three LCD panels, each panel optically and electronically coupled with one of the R,G,B beams to provide a full color LCD display system.

10. The system of claim 6, further comprising:

a first optical means to receive and shape the R,G,B beams;

a spatial light modulator means to receive the R,G,B beams from the optical means, and to modulate the R,G,B beams to produce a full color video image;

electronic means to operate the spatial light modulator means; and a second optical means to relay, combine, and project a full color video image on a screen.

11. The system of claim 10, wherein the spatial light modulator means comprises three transmissive or reflective LCD panels, one for each R,G,B beam.

12. The system of claim 10, wherein the first optical means includes expander, collimator and micro-array lens means to receive the R,G,B beams and to increase the R,G,B light transmission efficiency and minimize diffraction.

13. The system of claim 10, wherein the spatial light modulator means comprise three transmissive LCD panels, one for each R,G,B beam, and which system includes:

a) a first optical means which comprises a beam expander, collimator and micro-array lens means to expand, to collimate, and to increase transmission efficiency of the R,G,B beams from the light source and incident on the LCD panels;

b) a second optical means which comprises an optical means to re-collimate the R,G,B beams on the opposite side of the LCD panels; and c) projection means to project the re-collimated R,G,B beams onto a screen.

14. A method of producing a laser R, G, B light source of reduced speckle noise useful in a full color display system, which method comprises:

a) providing a laser output beam having a first output wavelength and a second output wavelength;

b) generating from the output beam at the first output wavelength, by crystal-based, non-linear frequency conversion, an intermediate beam having a spectral width substantially greater than a spectral width of the output beam at the first output wavelength and a wavelength longer than the first output wavelength, and subsequent crystal-based, non-linear sum frequency mixing of the intermediate beam with the output beam at the first output wavelength an R beam with a spectral width determined by the spectral width of the intermediate beam;

c) generating from the output beam at the first output wavelength by crystal-based, non-linear frequency conversion, a G beam with spatial incoherency effected by multi-longitudinal mode operation produced by an etalon located in a G-channel cavity;

d) generating from the output beam at the second output wavelength a frequency-doubled beam, and combining the laser output beam at the second output wavelength with the frequency-doubled beam by sum frequency generation to produce a B beam; and e) mixing the generated R,G and B beams to provide a full color beam with reduced speckle noise.

15. The laser light source of claim 14, wherein the first output wavelength is one of 1047 nm and 1064 nm, and the second output wavelength is 1342 nm.

* * * * *